United States Patent
Wei et al.

(10) Patent No.: US 7,786,711 B2
(45) Date of Patent: Aug. 31, 2010

(54) AUXILIARY TURN-ON MECHANISMS FOR REDUCING CONDUCTION LOSS IN BODY-DIODE OF LOW SIDE MOSFET OF COUPLED-INDUCTOR DC-DC CONVERTER

(75) Inventors: Jia Wei, Cary, NC (US); Kun Xing, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/259,220

(22) Filed: Oct. 27, 2008

(65) Prior Publication Data
US 2009/0046485 A1 Feb. 19, 2009

Related U.S. Application Data

(63) Continuation of application No. 11/519,516, filed on Sep. 12, 2006, now Pat. No. 7,443,146.

(60) Provisional application No. 60/747,945, filed on May 23, 2006.

(51) Int. Cl.
*G05F 1/613* (2006.01)
*G05F 1/00* (2006.01)
(52) U.S. Cl. .................................. 323/224; 323/272
(58) Field of Classification Search .......... 323/224, 323/272, 284
See application file for complete search history.

(56) References Cited

U.S. PATENT DOCUMENTS

| | | | | |
|---|---|---|---|---|
| 4,864,478 A | * | 9/1989 | Bloom | 323/362 |
| 6,897,641 B1 | * | 5/2005 | Herbert | 323/282 |
| 7,138,789 B2 | | 11/2006 | Moussaoui et al. | |

OTHER PUBLICATIONS

Intersil Data Sheet ISL6262, May 15, 2006; Two-Phase Core Regulator for IMVP-6 Mobile CPUs, pp. 27.
Intersil Data Sheet ISL6260, ISL6260B Jan. 3, 2006; Multiphase Core Regulator for IMVP-6 Mobile CPUs, pp. 26.
William Archer, "Current Drives synchronous rectifier", Design Ideas section, EDN (Electronic Design News), p. 279, Nov. 28, 1985.
W.E. Ripel, "Synchronous half wave rectifier" NASA Tech Brief vol. 13 No. 7, item #15, Jul. 1989.

* cited by examiner

*Primary Examiner*—Shawn Riley
(74) *Attorney, Agent, or Firm*—Paul A. Bernkopf; Graybeal Jackson LLP; Bryan A. Santarelli

(57) ABSTRACT

Conduction loss in the body-diode of a low side MOSFET of a power switching stage of one phase of a coupled-inductor, multi-phase DC-DC converter circuit, associated with current flow in the output inductor of that one phase that is induced by current flow in a mutually coupled output inductor of another phase, during normal switching of that other stage, is effectively prevented by applying auxiliary MOSFET turn-on signals, that coincide with the duration of the induced current, to that low side MOSFET, so that the induced current will flow through the turned-on low side MOSFET itself, thereby bypassing its body-diode.

62 Claims, 4 Drawing Sheets

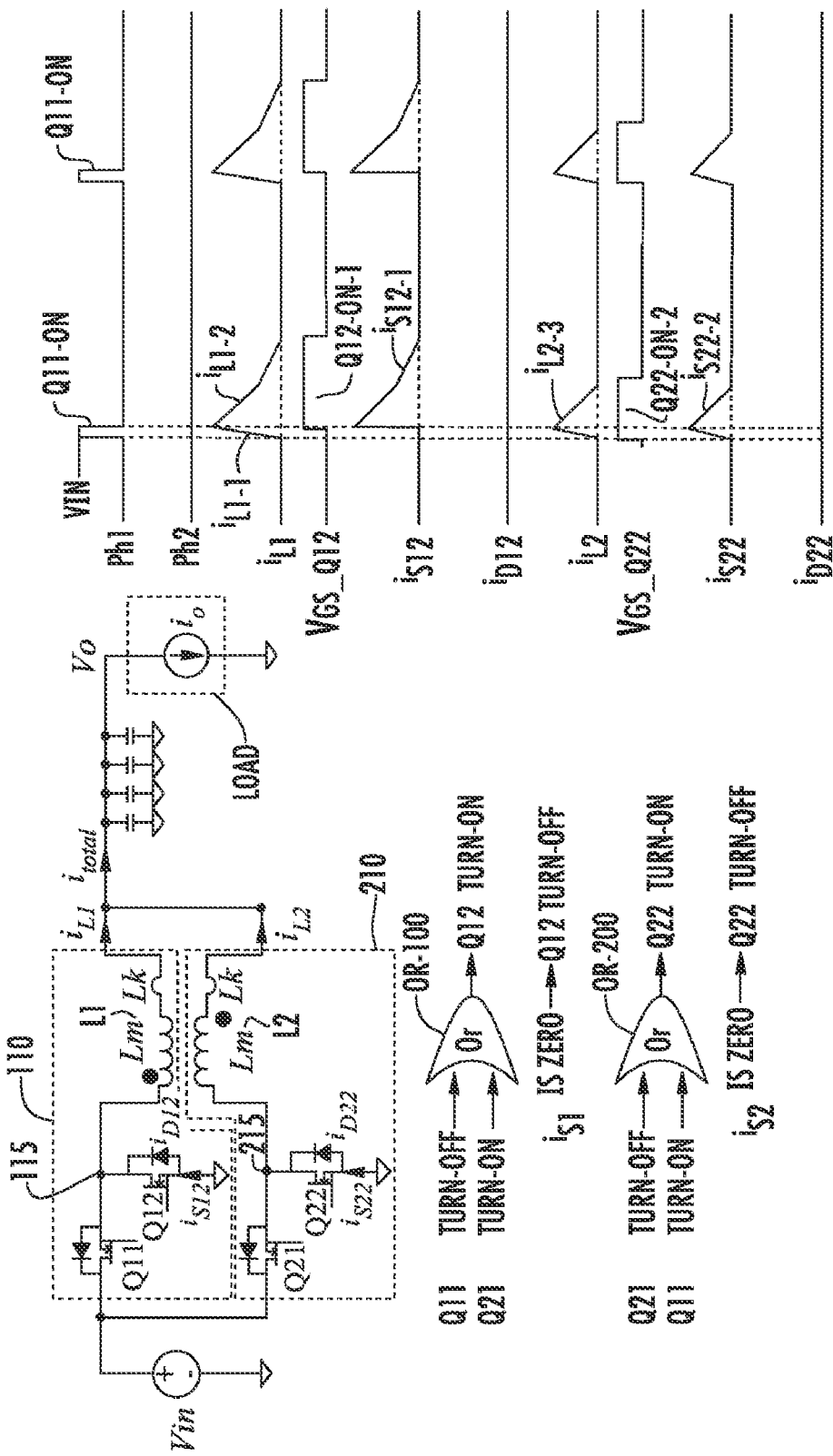

AUXILIARY TURN-ON MECHANISMS FOR REDUCING CONDUCTION LOSS IN BODY-DIODE OF LOW SIDE MOSFET OF COUPLED-INDUCTOR DC-DC CONVERTER

PRIORITY CLAIM

The present application is a Continuation of copending U.S. patent application Ser. No. 11/519,516, filed Sep. 12, 2006, which claims the benefit of U.S. Provisional Application Ser. No. 60/747,945, filed on May 23, 2006; all of the foregoing applications are incorporated herein by reference.

FIELD OF THE INVENTION

The present invention relates in general to DC power supply systems and subsystems thereof, and is particularly directed to a switching control mechanism for a coupled-inductor DC-DC converter.

BACKGROUND OF THE INVENTION

DC-DC converters are widely used to supply DC power to electronic devices, such as computers, printers, and the like, and are available in a variety of configurations for deriving a regulated DC output voltage from a source of input voltage. As a non-limiting example, a buck-mode or step-down DC-DC converter generates a regulated DC output voltage whose value is less than the value of the DC source voltage. A typical step-down DC-DC converter includes one or more phases or power channels, outputs of which are combined at an output node for delivering a stepped-down DC output voltage to a load. The output stage of each power channel contains power switches, current flow paths through which are controllably switched by a pulse width modulation (PWM) signal produced by a PWM modulator, in order to switchably connect a DC source voltage to one end of an output inductor, a second end of which is connected to the output node.

In addition to regulator implementations which have no mutual coupling among the inductors, there are regulator configurations which provide mutual coupling among the output inductors. These 'coupled-inductor' DC-DC converters have become increasingly attractive for supplying power to portable electronic device applications, such as, but not limited to, notebook computers, and the like, which require discontinuous current mode (DCM) operation during low or relatively light load (e.g., quiescent or 'sleep' mode) conditions, in order to reduce power loss and preserve battery life. For DCM operation, the upper and lower MOSFETs of a respective power switching stage of the converter are turned on and off for relatively brief or 'pulsed' intervals, so that a conductive path for current flow through that stage's output inductor and one or the other of the respective terminals of the input power supply is provided through one or the other of a pair of power switching MOSFETs, in a discontinuous, rather than a continuous, manner, thereby reducing output current flow to accommodate the relatively light current demand during such low load conditions.

A non-limiting example of a conventional dual-phase, coupled inductor DCM buck-mode regulator or DC-DC converter, in which the output inductors of the respective phases or power channels are mutually coupled with one another, is diagrammatically illustrated in FIG. 1. As shown therein, the dual-phase DCM regulator of FIG. 1 comprises two power channels that produce respective output currents $i_{L1}$ and $i_{L2}$, which flow from phase nodes 115 and 215 of respective power switching stages 110 and 210 of the two phase through respective output inductors L1 and L2, that are mutually coupled with one another, such that currents induced therein due to their mutual coupling flow in the same direction (from the phase nodes into the output node OUT) as the normal currents produced by the switching of the inverter stages. These two output currents are summed at an output node OUT, to produce a composite or total output current $I_{total}$. Output node OUT provides an output voltage Vo for powering a device LOAD, such as the microprocessor of a notebook computer, through which a load current $i_o$ flows.

In order to regulate the output voltage Vo, the voltage at the output node OUT is fed back to an error amplifier (EA) 310, which is operative to compare the monitored output voltage Vo with a reference voltage VID. The voltage difference output Comp of the error amplifier 310 is supplied to a supervisory controller 315. Controller 315 is operative to precisely control the pulse widths of associated streams of pulse width modulation (PWM) waveforms, that are applied by respective PWM generators within the controller to driver circuits, whose outputs are coupled to the gates of and control the on/off switching times of the upper and lower switching devices (MOSFETs Q11/Q21 and MOSFETs Q12/Q22) of the output power switching stages 110 and 210. In a typical application, the PWM waveforms are sequenced and timed such that the interval between rising edges (or in some implementations, falling edges) thereof is constant, in order to equalize the output currents $i_{L1}$ and $i_{L2}$ of the two power channels.

In addition to monitoring the output voltage Vo, error amplifier 310 monitors the output currents of the two channels via respective sense resistors Rsn1 and Rsn2 that are coupled between the phase nodes 115 and 215 and a first, non-inverting (+) input 321 of a (K gain) transconductance amplifier 320. Amplifier 320 has a second, inverting (−) input 322 coupled to the output node OUT, and a sense capacitor Csns connected across its inputs. Amplifier 320 allows the sum of the current measurements to be used to precisely regulate the output resistance in a method commonly known as droop regulation or load-line regulation. The voltage output Vdroop of the amplifier 320 is coupled to a first input 331 of a subtraction circuit 330, a second input 332 of which is coupled to the output node OUT. The Vdroop voltage output of amplifier 320 is added to the output voltage Vo to provide a difference voltage Vdiff that is coupled to a first, inverting (−) input 311 of error amplifier 310. The second, non-inverting (+) input 312 of error amplifier 310 is coupled to receive the reference voltage VID. As described above, the output voltage Comp of error amplifier 310 is used by the controller 315 to control the pulse widths of the PWM waveforms that control the on/off switching of the upper and low MOSFETs of the power switching stages 110 and 210.

These PWM waveforms are shown in FIG. 2 as including a first PWM waveform PH1, that is used to control the on/off switching of the upper MOSFET switch Q11 of the power switching stage 110 of the first phase or channel, and a second PWM waveform PH2, that is used to control the on/off switching of the upper MOSFET switch Q21 of the power switching stage 210 of the second phase. For balanced-phase operation, the frequencies of the two PWM waveforms are the same and the times of occurrence of the turn-on pulses Q11-ON of the first PWM waveform PH1 are midway between the times of occurrence of the turn-on pulses Q21-ON of the second PWM waveform PH2, and vice versa. During the intervals that the pulses of the waveforms PH1 and PH2 are high, MOSFETs Q11 and Q21 are turned on thereby, so that increasing or ramping up segments $i_{f1-1}$ and $i_{L2-1}$ of respective currents $i_{L1}$ and $i_{L2}$ flow therethrough and, via phase nodes 115 and 215, through output inductors L1 and L2 to output node OUT, as shown in FIG. 2.

As further shown in FIG. 2, when the turn-on pulse Q11-ON of the PWM waveform PH1 goes low, a PWM waveform $V_{GS\_Q12}$, that is used to control the on/off switching of the lower MOSFET switch Q12 of the power switching stage 110 of the first phase, transitions high for a prescribed period Q12-ON, corresponding to the pulse width interval of PWM waveform $V_{GS\_Q12}$. With MOSFET switch Q12 turned on during this interval, the inductor current $i_{L1}$ of the first channel gradually decreases or ramps down to zero from its peak value at the end of the duration or width of the turn-on pulse Q11-ON of PWM waveform PH1, as shown at $i_{L1-2}$. The ramping down portion $i_{L1-2}$ of the output current $i_{L1}$ is supplied by a portion $i_{S12-1}$ of a current $i_{S12}$ that flows from ground through the source-drain path of MOSFET Q12 to phase node 115 and into the inductor L1.

In like manner, when the turn-on pulse Q21-ON of the PWM waveform PH2 goes low, a PWM waveform $V_{GS\_Q22}$, that is used to control the on/off switching of the lower MOSFET switch Q22 of the power switching stage 210 of the second phase, transitions high for a prescribed period Q22-ON corresponding to the pulse width interval of PWM waveform $V_{GS\_Q22}$. With MOSFET switch Q22 turned on during this interval, the inductor current $i_{L2}$ of the second channel gradually ramps down to zero from its peak value at the end of the duration of the turn-on pulse Q21-ON of PWM waveform PH2, as shown at $i_{L2-1}$. The ramping down portion $i_{L2-2}$ of the output current $i_{L1}$ is supplied by a portion $i_{S22-1}$ of a current $i_{S22}$ that flows from ground through the source-drain path of MOSFET Q22 to phase node 215 and into the inductor L2.

As pointed out above, because the output inductor L1 of the power switching stage 110 is mutually coupled with the output inductor L2 of the power switching stage 210, the current $i_{L1}$ through inductor L1, that results from the successive PWM-controlled turn on of the MOSFETs Q11 and Q12, will induce a current in the inductor L2 of the second phase, shown in the current waveform $i_{L2}$ of FIG. 2 as induced current $i_{L2-3}$. Since the upper MOSFET Q21 of the second phase is off during this time (PH2 is low), and the polarity of its body-diode is oriented so as to inherently block the flow of current therethrough from the input voltage supply rail Vin to phase node 215, no current is drawn through the upper MOSFET Q21 to supply the induced current $i_{L2-3}$. MOSFET Q22 of the second phase is also off at this time, since its switching PWM waveform $V_{GS\_Q22}$ is low. However, the polarity orientation of its body-diode allows the flow of a current $i_{S22-2}$ from ground and through its body-diode as a body-diode current $i_{D22}$ to phase node 215 and into inductor L2 as the induced current $i_{L2-3}$.

In like manner, the current $i_{L2}$ through inductor L2, that results from the successive PWM-controlled turn on of the MOSFETs Q21 and Q22, will induce a current in the inductor L1 of the first phase, shown in the current waveform $i_{L1}$ of FIG. 2 as induced current $i_{L1-3}$. Since the upper MOSFET Q11 of the first phase is off and the polarity of its body-diode is oriented so as to inherently block the flow of current therethrough from the input voltage supply rail Vin, no current is drawn through the upper MOSFET Q11 to provide the induced current $i_{L1-3}$. However, even though the lower MOSFET Q12 of the first phase is off, since its switching PWM waveform $V_{GS\_Q12}$ is low, the polarity orientation of its body-diode is such as to allow the flow of a current $i_{S12-2}$ from ground and through its body-diode as a body-diode current $i_{D12}$ to phase node 115 and into inductor L1 as the induced current $i_{L1-3}$.

Unfortunately, because the two induced currents $i_{L1-3}$ and $i_{L2-3}$ are supplied by way of respective currents $i_{D12}$ and $i_{D22}$ through the body diodes of lower MOSFETs Q12 and Q22, they cause significant conduction loss in these MOSFETs.

SUMMARY OF THE INVENTION

Pursuant to the invention, this body-diode conduction loss problem is successfully addressed by supplementing the MOSFET switching control (PWM) waveforms, through which the regulator's supervisory controller controls on/off switching of MOSFETs (e.g., low side MOSFETs) of the two power stages, with auxiliary switching signals, such as additional on-time pulse width portions of the PWM waveforms themselves, that coincide with the durations of the induced currents in the opposite phases. As a result, rather than being forced to flow as respective body-diode currents through the body-diodes of the (low side) MOSFETs, the induced currents will flow through the turned-on (low side) MOSFETs, thereby by-passing and eliminating conduction losses in their body-diodes.

In accordance with a first embodiment of the invention—for dual-phase, discontinuous mode of operation of a buck-mode regulator of the type shown in FIG. 1—the switching control operation performed by the converter's supervisory controller is augmented to include logical-OR functionality that is effective to insert, into the respective switching PWM waveforms that control the turn-on times of the low side MOSFETs, respective auxiliary on-time pulse width portions that coincide with the durations of the induced currents in the inductors of the power stages of their opposite phases. Coincidence between these auxiliary on-time pulse width portions of the PWM switching waveforms and the times during which currents are induced in the output inductors ensures that the low side MOSFETs will be turned on at the same times that currents are induced in the output inductors, so that the induced currents flow through the low side MOSFETs, rather than their body-diodes.

In accordance with a second embodiment of the invention—for the case of single-phase, discontinuous mode of operation of the buck-mode regulator of the type shown in FIG. 1—the switching control operation performed by the converter's supervisory controller is also augmented to include additional logical-OR functionality. For single-phase operation, however, normal PWM switching signals are provided for only one power switching stage of the dual-phase DCM converter embodiment. However, a current is induced in the inductor of the other power switching stage, as a result of the flow of non-induced current through the output inductor of the one power switching stage during normal operation of its upper and lower MOSFETS. In order to prevent this induced current from being supplied by way of the body-diode of the lower MOSFET of other power switching stage, the additional logical-OR functionality is used to supply an auxiliary, PWM switching signal for the low side MOSFET of the other power switching stage. The time of occurrence and duration of this auxiliary PWM switching signal is the same as the time of occurrence and duration of the induced current, so that the induced current will flow through the low side MOSFET of the other power switching stage, rather than through the body-diode of that low side MOSFET, and thereby prevent conduction loss in that MOSFET's body-diode.

A third embodiment of the invention is used for the case of single-phase, continuous conduction mode of operation of the buck-mode regulator of the type shown in FIG. 1, wherein the upper and lower MOSFETs of only one of the two power switching stages are switched in a complementary manner, so that a conductive path for current flow through the output inductor of that stage and one or the other of the respective terminals of the input power supply will be continuously provided through one or the other of these two MOSFETs. As the case of single-phase discontinuous conduction mode of operation of the regulator, for which the second embodiment of the invention is used, normal PWM switching signals are provided for only one power switching stage of the dual-phase DCM converter embodiment. Again, however, a current is induced in the inductor of the other power switching stage, as a result of the flow of non-induced current through the output inductor of the one power switching stage.

As in the second embodiment, in order to prevent this induced current from being supplied by way of the body-diode of the lower MOSFET of the other power switching stage, the switching control operation performed by the converter's supervisory controller is augmented to include additional logical-OR functionality, that supplies an auxiliary, PWM switching signal for the low side MOSFET of the other power switching stage. The time of occurrence and duration of this auxiliary PWM switching signal is the same as the time of occurrence and duration of the induced current, so that the induced current will flow through the low side MOSFET of the other power switching stage, rather than through the body-diode of that low side MOSFET, and thereby prevent conduction loss in that MOSFET's body-diode.

BRIEF DESCRIPTION OF THE DRAWINGS

FIG. 5 is a reduced complexity, diagrammatic illustration of a second embodiment of the invention for the case of single phase DCM operation of the buck-mode regulator shown in FIG. 3;

FIG. 6 shows waveform diagrams associated with the single phase DCM operation of the buck-mode regulator of FIG. 5;

DETAILED DESCRIPTION

Figures 1, 2:
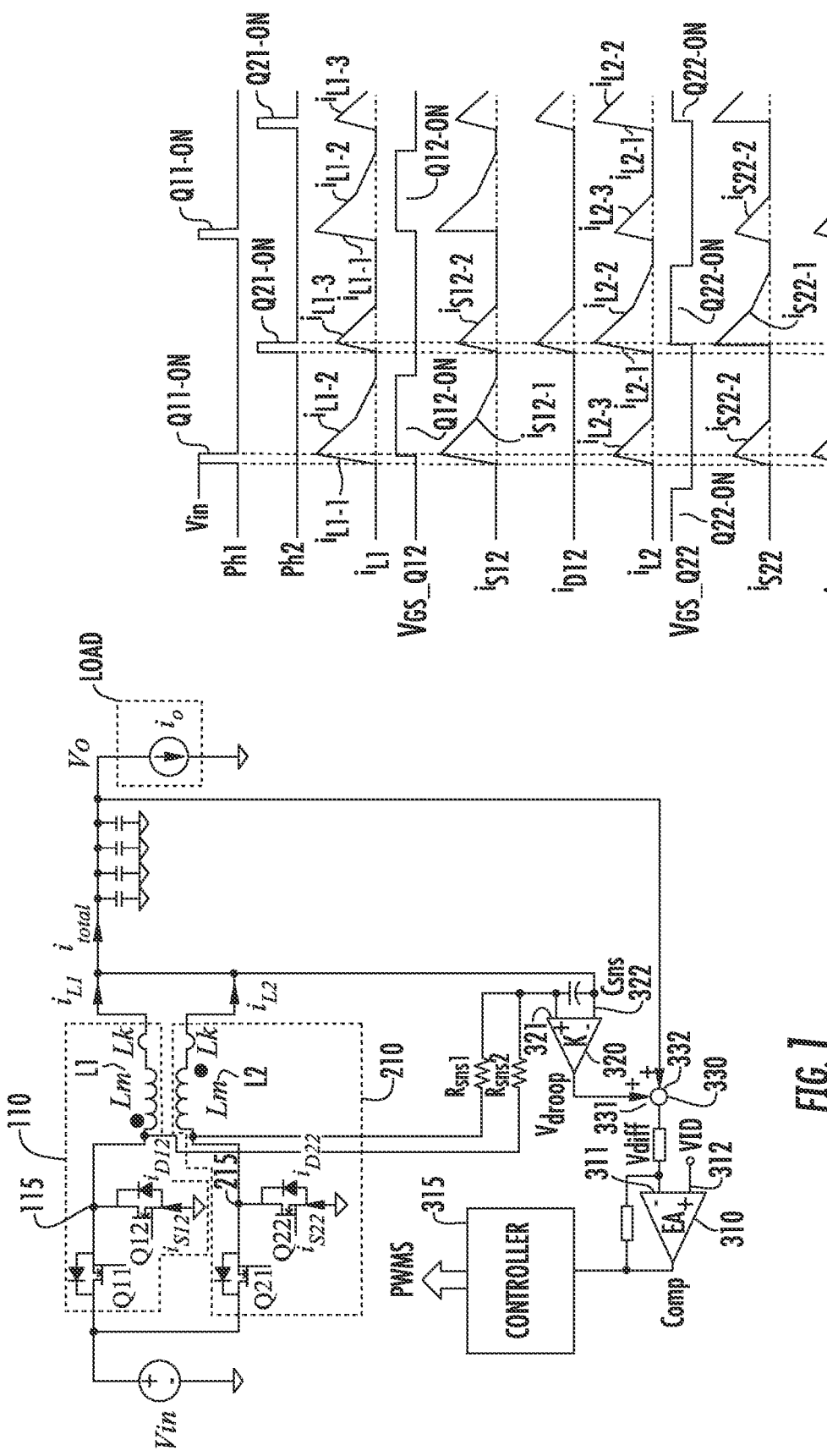
FIG. 1 diagrammatically illustrates the overall circuit architecture of a non-limiting example of a conventional dual-phase, coupled inductor, buck-mode regulator or DC-DC converter, in which the output inductors of the regulator's output power stages are mutually coupled with one another.
FIG. 2 shows waveform diagrams associated with DCM operation of the conventional dual-phase, buck-mode regulator of FIG. 1.

Before describing the details of the switching control mechanism of the present invention, it should be observed that the invention resides primarily in an augmentation of the normal switching control functionality of the supervisory controller for a coupled-inductor DC-DC converter, such as, but not limited to a buck-mode DC-DC converter, and not in a particular implementation of the controller, per se. As such, the invention has been illustrated in the drawings by readily understandable circuit architecture and associated waveform diagrams, which depict only those specific details that are pertinent to the invention, so as not to obscure the disclosure with details which will be readily apparent to those skilled in the art having the benefit of the description herein.

As described briefly above, in accordance with the present invention, the functionality of the regulator's supervisory controller is augmented, such that the PWM waveforms it produces to control the on/off switching of the low side MOSFETs of the power stages include auxiliary pulse signals having widths that coincide with the durations of the induced currents in the opposite phases. As a result, rather than flowing as respective body-diode currents through the body-diodes of the MOSFETs, the induced currents flow instead through the turned-on MOSFETs, thereby eliminating conduction losses in their body-diodes.

Figures 3, 4:
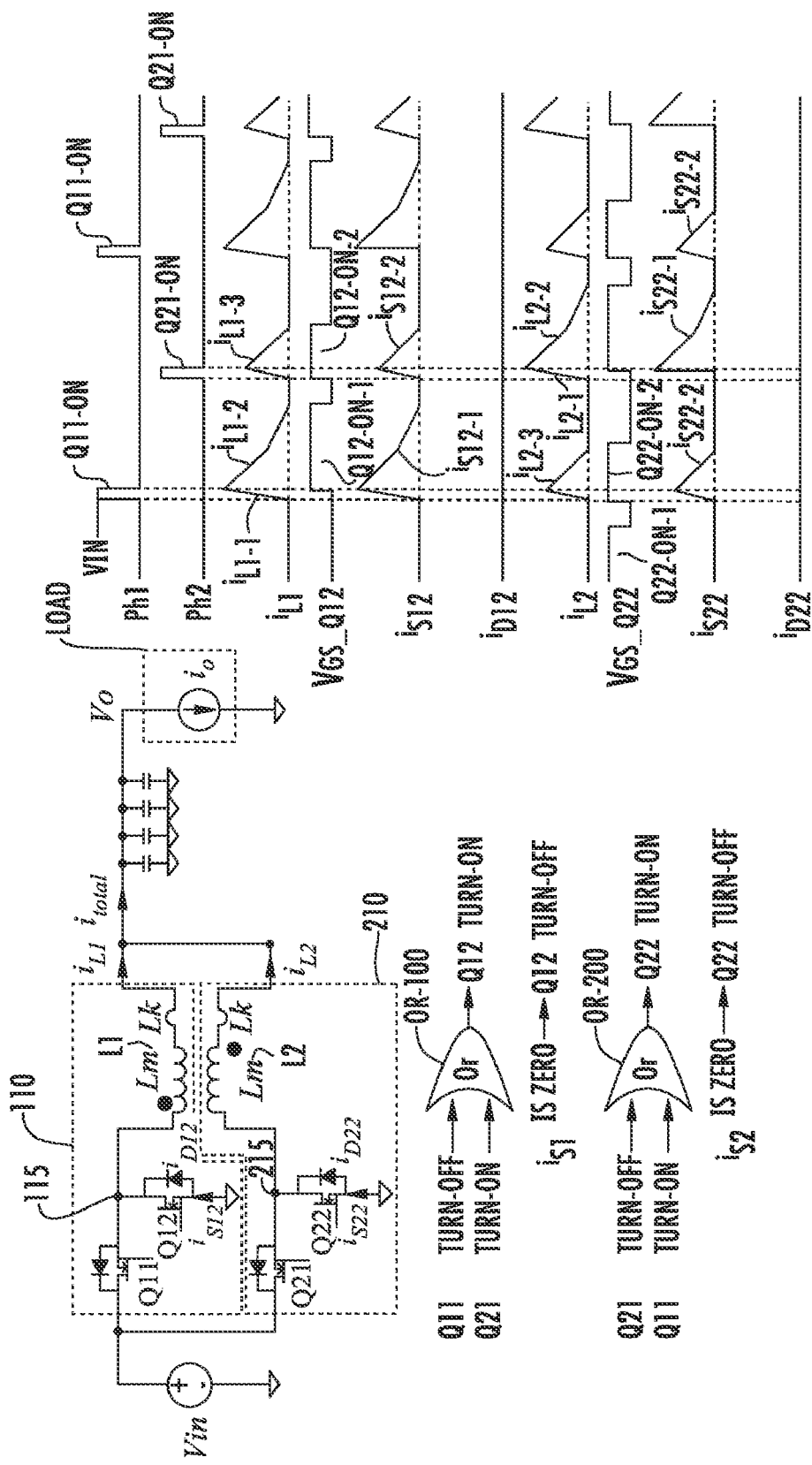
FIG. 3 is a reduced complexity, diagrammatic illustration of a first embodiment of the invention for the case of dual-phase DCM operation of a buck-mode regulator of the type shown in FIG. 1.
FIG. 4 shows waveform diagrams associated with DCM operation of the dual-phase, buck-mode regulator of FIG. 3.

Attention is initially directed to FIG. 3 which is a reduced complexity, diagrammatic illustration of a first embodiment of the invention for the case of a dual-phase, discontinuous conduction mode of operation of a (buck-mode type of) regulator of FIG. 1, described above, and FIG. 4, which shows a set of waveform diagrams associated with the operation of FIG. 3. More particularly, the circuit architecture diagram of FIG. 3 shows the two phases of the DCM regulator architecture of FIG. 1, but omits an illustration of the feedback connections to the supervisory switching controller, to simplify the drawing.

Instead, the augmentation of the functionality of the supervisory controller (315 in FIG. 1) is represented in FIG. 3 by a pair of OR gate functions OR-100 and OR-200, that are employed by the supervisory controller to insert additional or auxiliary on-time pulse width portions into the respective switching PWM waveforms $V_{GS\_Q12}$ and $V_{GS\_Q22}$, and are effective to turn on the low side MOSFETs Q12 and Q22 of respective power switching stages 110 and 210, at times that coincide with the durations of the induced currents in the inductors of the power stages of their opposite phases.

To this end, the OR gate function OR-100 for power switching stage 110 has a first input coupled to monitor the turning-off of the upper switching MOSFET Q11, which occurs at a high-to-low transition of the pulse Q11-ON of PWM waveform PH1, and a second input coupled to monitor the turning-on of the upper switching MOSFET Q21 of the opposite power stage 210, which occurs at a low-to-high transition of the pulse Q21-ON of PWM waveform PH2. When either of these events occurs, the PWM waveform $V_{GS\_Q12}$, that is used to control the on/off switching of lower switching MOSFET switch Q12 of power switching stage 110, transitions from low-to-high.

In particular, in response to a high-to-low transition of the pulse Q11-ON of PWM waveform PH1, the PWM waveform $V_{GS\_Q12}$ transitions from low-to-high for a first pulse width interval Q12-ON-1; in addition, in response to a low-to-high transition of the pulse Q21-ON of PWM waveform PH2, PWM waveform $V_{GS\_Q12}$ transitions from low-to-high for a second or auxiliary pulse width interval Q12-ON-2. As a consequence, both the ramping down portion $i_{L1-2}$ of the non-induced current ($i_{L1-1}+i_{L1-2}$) through inductor L1 and the entirety of the current $i_{L1-3}$ induced therein by the non-induced current ($i_{L2-1}+i_{L2-2}$) flowing through inductor L2 will flow through the source-drain path of lower MOSFET Q12. None of the induced current flowing through inductor L1 will flow as a body-diode current $i_{D12}$ through the body-diode of MOSFET Q12, so as to eliminate an associated conduction loss in the body-diode of MOSFET Q12. To control the turn-off of the lower MOSFET switch Q12, its source-drain current $i_{S12}$ is monitored. Whenever the source-drain current $i_{S12}$ goes to zero, the PWM waveform $V_{GS\_Q12}$ transitions from high-to-low, so that the lower MOSFET switch Q12 is turned off.

In a like manner, the OR gate function OR-200 for power switching stage 210 has a first input coupled to monitor the turning-off of the upper switching MOSFET Q21, which occurs at a high-to-low transition of the pulse Q21-ON of PWM waveform PH2, and a second input coupled to monitor the turning-on of the upper switching MOSFET Q11 of the opposite power switching stage 110, which occurs at a low-to-high transition of the pulse Q11-ON of PWM waveform PH1. When either of these events occurs, the PWM waveform $V_{GS\_Q22}$, that is used to control the on/off switching of the lower switching MOSFET switch Q22 of power switching stage 210, transitions from low-to-high.

More particularly, in response to a high-to-low transition of the pulse Q21-ON of PWM waveform PH2, the PWM waveform $V_{GS\_Q22}$ transitions from low-to-high for a first pulse width interval Q22-ON-1; in addition, in response to a low-to-high transition of the pulse Q11-ON of PWM waveform PH1, PWM waveform $V_{GS\_Q22}$ transitions from low-to-high for a second or auxiliary pulse width interval Q22-ON-2. As a consequence, both the ramping down portion $i_{L2\text{-}2}$ of the non-induced current ($i_{L2\text{-}1}+i_{L2\text{-}2}$) through inductor L2 and the entirety of the current $i_{L2\text{-}3}$ induced therein by the non-induced current ($i_{L1\text{-}1}+i_{L1\text{-}2}$) flowing through inductor L1 will flow through the source-drain path of lower MOSFET Q22. None of the induced current flowing through inductor L2 will flow as a body-diode current $i_{D22}$ through the body-diode of MOSFET Q22, so as to eliminate an associated conduction loss in the body-diode of MOSFET Q22. To control the turn-off of the lower MOSFET switch Q22, its source-drain current $i_{S22}$ is monitored. Whenever the source-drain current $i_{S22}$ goes to zero, the PWM waveform $V_{GS\_Q22}$ transitions from high-to-low, so that the lower MOSFET switch Q22 is turned off.

The circuit architecture diagram of FIG. 5 and its associated set of waveforms shown in FIG. 6 correspond to the case of providing normal PWM switching signals for only one of the power switching stages—power stage 110—of the dual-phase discontinuous conduction mode converter embodiment of FIGS. 3 and 4, described above. In this second embodiment of the invention, there is no PH2 pulse for turning on the upper MOSFET switch Q21 of power switching stage 210. As such, the inputs to OR gate functions OR-100 and OR-200 associated with the turn-on and turn-off of MOSFET Q21 are zero. Moreover, since there is no PH2 pulse that initiates the flow of non-inducted current $i_{L2}$ through the inductor L2, the PWM waveform $V_{GS\_Q22}$ does not transition from low-to-high for a prescribed duration Q22-ON-1 associated with the ramp down of a (non-existent) non-induced portion of current $i_{L2}$ through the inductor L2 at the end of the (non-existent) PH2 pulse (since there is no non-induced current $i_{L2}$ flowing through inductor L2 to begin with). As a consequence, the PWM waveform $V_{GS\_Q12}$ for lower MOSFET switch Q12 of power switching stage 110 does not require an auxiliary pulse width portion (shown at Q12-ON-2 in FIG. 4), to turn on the lower MOSFET switch Q12 of power switching stage 210 to accommodate a (non-existent) induced current through inductor L1.

However, in the second, single-phase DCM embodiment of FIGS. 5 and 6, there is an induced current $i_{L2\text{-}3}$ that flows through the inductor L2 of the power switching stage 210, as a result of the flow of the non-induced current $i_{L1}$ through inductor L1 during the normal operation of the upper and lower MOSFETS Q11 and Q12 of power switching stage 110. In order to prevent this induced current $i_{L2\text{-}3}$ from being supplied by way of the body-diode of the lower MOSFET Q22 of power switching stage 210, the pulse width portion Q22-ON-2 of the PWM waveform $V_{GS\_Q22}$ of the first, dual phase DCM embodiment FIGS. 3 and 4 is used in the second, single-phase DCM embodiment of FIGS. 5 and 6 to turn on and provide for the flow of source-drain current $i_{S22}$ through the lower MOSFET Q22 during the induced current $i_{L2\text{-}3}$. The time of occurrence and duration of the pulse width Q22-ON-2 of PWM waveform $V_{GS\_Q22}$ is the same as the time of occurrence and duration of the induced current $i_{L2\text{-}3}$, as in the first embodiment of FIGS. 3 and 4. As a result, as in the first embodiment of FIGS. 3 and 4, all of the induced current ($i_{L2\text{-}3}=i_{S22\text{-}2}$) flowing through inductor L2 will flow through turned-on low side MOSFET Q22, rather than through its body-diode as a body-diode current $i_{D22}$, so as to eliminate an associated conduction loss in the body-diode of MOSFET Q22.

Figures 7, 8:
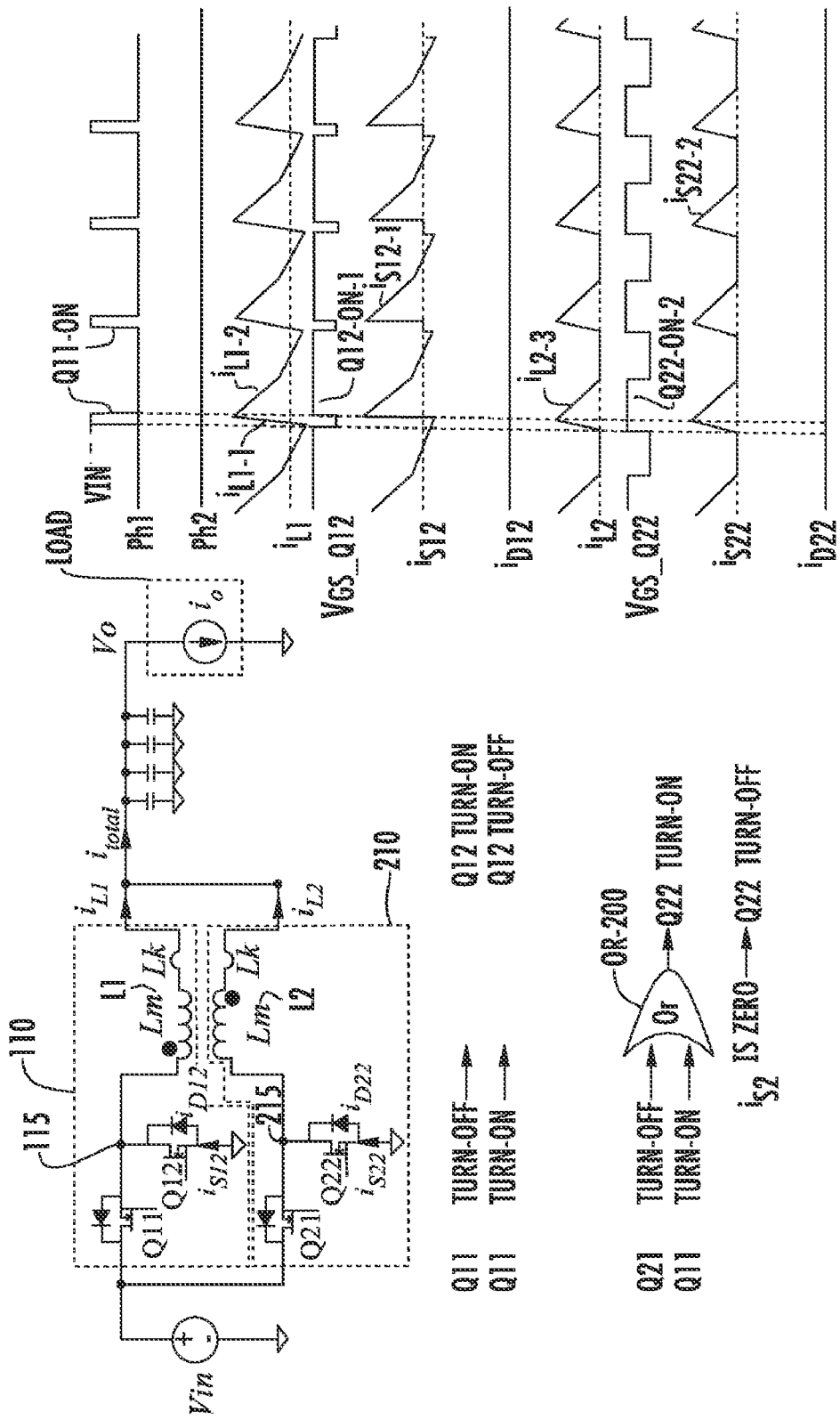
FIG. 7 is a reduced complexity, diagrammatic illustration of a third embodiment of the invention for the case of a single phase CCM operation of the buck-mode regulator shown in FIG. 3.
FIG. 8 shows waveform diagrams associated with the single phase CCM operation of the buck-mode regulator of FIG. 7.

FIG. 7 is a reduced complexity, diagrammatic illustration of a third embodiment of the invention for the case of a single phase CCM operation of the buck-mode regulator, while FIG. 8 shows a set of waveform diagrams associated with the operation of the circuit architecture of FIG. 7. For CCM single-phase operation, the upper and lower MOSFETs Q11 and Q12 of power switching stage 110 are turned on and off in a complementary manner, so that a conductive path for current flow through the inductor L1 and one or the other of the respective terminals (Vin and ground) of the input power supply will be continuously provided through one or the other of these MOSFETs. Thus, the inductor current $i_{L1}$ through output inductor L1 is repetitively ramped up and down between positive and negative peaks thereof, as the complementary PWM waveforms PH1 and $V_{GS\_Q12}$ alternately turn MOSFETs Q11 and Q12 on and off, as shown in the waveform diagram of FIG. 8.

Similar to the diagrammatic illustrations of the respective dual-phase and single-phase DCM embodiments of FIGS. 3 and 5, the circuit architecture diagram of FIG. 7 is essentially the same as the DCM buck-mode regulator of FIG. 1, but omits an illustration of the feedback connections to the supervisory controller, in order to simplify the drawing. Instead, as in the circuit architecture diagrams of FIGS. 3 and 5, FIG. 7 shows a control diagram representative of the control function that is executed by the supervisory controller, to control the turn-on and turn-off times of the high side MOSFET Q11 and the low side MOSFET Q12 of power switching stage 110 by respective PWM complementary switching waveforms PH1 and $V_{GS\_Q12}$, as well as the OR gate function OR-200 that is used to control auxiliary turn-on and turn-off times of the low side MOSFET Q22 of the power switching stage 210, in accordance with PWM waveform $V_{GS\_Q22}$, at times that coincide with the durations of currents induced in inductor L2 of power switching stage 210.

More particularly, as in the single-phase DCM regulator embodiment of FIGS. 5 and 6, in the single-phase CCM regulator embodiment of FIGS. 7 and 8, there is no PH2 pulse for turning on the upper MOSFET switch Q21 of power switching stage 210. As such, the input to OR-gate function OR-200 associated with the turn-off of MOSFET Q21 is zero. Moreover, since there is no PH2 pulse that initiates the flow of non-inducted current $i_{L2}$ through the inductor L2, the PWM waveform $V_{GS\_Q22}$ does not transition from low-to-high for a prescribed duration Q22-ON-1 associated with the ramp down of a (non-existent) non-induced portion of current $i_{L2}$ through the inductor L2 at the end of the (non-existent) PH2 pulse (since there is no non-induced current $i_{L2}$ flowing through inductor L2 to begin with). As a consequence, the PWM waveform $V_{GS\_Q12}$ for lower MOSFET switch Q12 of power switching stage 110 does not require an auxiliary pulse width portion (shown at Q12-ON-2 in FIG. 4), to turn on the lower MOSFET switch Q12 of power switching stage 210 to accommodate a (non-existent) induced current through inductor L1.

However, as in the single-phase DCM embodiment of FIGS. 5 and 6, there is an induced current $i_{L2-3}$ that flows through the inductor L2 as a result of the flow of the non-induced current $i_{L1}$ through inductor L1 during the normal operation of the upper and lower MOSFETS Q11 and Q12 of power switching stage 110. In order to prevent this induced current $i_{L2-3}$ from being supplied by way of the body-diode of the lower MOSFET Q22 of power switching stage 210, the pulse width portion Q22-ON-2 of the PWM waveform $V_{GS\_Q22}$ of FIG. 4 is again used to turn on and provide for the flow of source-drain current $i_{S22}$ through the lower MOSFET Q22 during the induced current $i_{L2-3}$. The time of occurrence and duration of the pulse width Q22-ON-2 of PWM waveform $V_{GS\_Q22}$ is the same as the time of occurrence and duration of the induced current $i_{L2-3}$, as in the embodiments of FIGS. 3-6. As a result, as in the embodiments of FIGS. 3-6, all of the induced current ($i_{L2-3}=i_{S22-2}$) flowing through inductor L2 will flow through turned-on low side MOSFET Q22, rather than through its body-diode as a body-diode current $i_{D22}$, eliminating conduction loss in the body-diode of MOSFET Q22.

As will be appreciated from the foregoing description, the problem of body-diode conduction loss in a coupled-inductor DC-DC converter is successfully in accordance with the present invention, by incorporating into the MOSFET switching control (PWM) waveforms, through which the regulator's supervisory controller controls on/off switching of the low side MOSFETs of the two power stages, auxiliary on-time pulse width portions, that coincide with the durations of the induced currents in the opposite phases. As a result, rather than being forced to flow as respective body-diode currents through the body-diodes of the MOSFETs, the induced currents will flow through the turned-on MOSFETs themselves, thereby eliminating conduction losses in their body-diodes.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A power supply controller, comprising:
   a first circuit operable to cause a first current to flow through a first phase of a power supply in a first direction; and
   a second circuit operable to cause the second phase of the power supply to operate in a reduced power dissipation mode while only a second current magnetically induced by the first current flows through the second phase in the first direction.

2. The power supply controller of claim 1 wherein the first circuit is further operable to cause the first current to flow by closing a supply side switch of the first phase.

3. The power supply controller of claim 1 wherein the first circuit is further operable to cause the first current to flow by closing a supply side transistor of the first phase.

4. The power supply controller of claim 1 wherein the first circuit is further operable to cause the first current to flow by closing a first supply side switch of the first phase and opening a first reference side switch of the first phase.

5. The power supply controller of claim 1 wherein the second circuit is further operable to cause the second phase to operate in the reduced power dissipation mode by closing a reference side switch of the second phase.

6. The power supply controller of claim 1 wherein the second circuit is further operable to cause the second phase to operate in the reduced power dissipation mode by closing a reference side transistor of the second phase.

7. The power supply controller of claim 1 wherein the second circuit is further operable to cause the second phase to exit the reduced power dissipation mode in response to the second current having a magnitude that is below a threshold.

8. The power supply controller of claim 1 wherein the second circuit is further operable to cause the second phase to exit the reduced power dissipation mode in response to a total current flowing through the second phase in a second direction opposite to the first direction.

9. The power supply controller of claim 1 wherein the second circuit is further operable to cause the second phase to exit the reduced power dissipation mode by opening a reference side switch of the second phase in response to a total current substantially equaling zero flowing through the second phase.

10. The power supply controller of claim 1 wherein the second circuit is further operable to cause the second phase to exit the reduced power dissipation mode by opening a reference side switch of the second phase in response to a total current flowing through the second phase in a direction opposite to the first direction.

11. The power supply controller of claim 1 wherein the second circuit is further operable to cause the second phase to exit the reduced power dissipation mode by opening a reference side switch of the second phase.

12. A power supply controller, comprising:
    a first circuit operable to open and close a first drive switch of a first power supply phase;
    a second circuit operable to open and close a second circulation switch of a second power supply phase that is magnetically coupled to the first power supply phase; and
    a third circuit operable to cause the second circuit to close the second circulation switch while the first drive switch is closed, while a second current flows through the second power supply phase, the second current being magnetically induced by a first current flowing through the first power supply phase, and while no other forward current flows through the second phase.

13. The power supply controller of claim 12 wherein:
    the second circulation switch of the second circuit is operable to open and close a second drive switch of the second power supply phase; and
    the third circuit is operable to cause the second circuit to close the second circulation switch while the second drive switch is open.

14. The power supply controller of claim 12 wherein:
    the second circuit is operable to open and close a second drive switch of the second power supply phase; and
    the third circuit is operable to cause the second circuit to open the second circulation switch while the second drive switch is closed.

15. The power supply controller of claim 12 wherein the third circuit is operable to cause the second circuit to open the second circulation switch in response to a magnitude of current below a threshold flowing through the second power supply phase.

16. The power supply controller of claim 12 wherein the third circuit is operable to cause the second circuit to open the second circulation switch in response to a reverse current flowing through the second power supply phase.

17. The power supply controller of claim 12 wherein:
the first circuit is operable to open and close a first circulation switch of the first power supply phase;
the second circuit is operable to open and close a second drive switch of the second power supply phase; and
the third circuit is operable to cause the first circuit to close the first circulation switch while the second drive switch is closed.

18. The power supply controller of claim 17 wherein the third circuit is operable to cause the first circuit to close the first circulation switch while the first drive switch is open.

19. The power supply controller of claim 17 wherein the third circuit is operable to cause the first circuit to open the first circulation switch while the first drive switch is closed.

20. The power supply controller of claim 17 wherein the third circuit is operable to cause the first circuit to open the first circulation switch in response to a magnitude of current below a threshold flowing through the first power supply phase.

21. The power supply controller of claim 17 wherein the third circuit is operable to cause the first circuit to open the first circulation switch in response to a reverse current flowing through the first power supply phase.

22. A power supply, comprising:
an input node;
a reference node;
an output node operable to provide a regulated output signal;
a first phase coupled to the input, reference, and output nodes;
a second phase coupled to the input, reference, and output nodes and being magnetically coupled to the first phase; and
a power supply controller, comprising:
a first circuit operable to cause a first current to flow from the input node, through the first phase, to the output node, and
a second circuit operable to cause the second phase of the power supply to operate in a reduced power dissipation mode while a second current magnetically induced by the first current is the only forward current that flows from the reference node, through the second phase, to the output node.

23. The power supply of claim 22 wherein:
the first phase comprises
a first inductor having a first node and having a second node coupled to the output node,
a first drive switch coupled between the input node and the first node of the inductor, and
a first circulation switch coupled between the reference node and the first node of the inductor; and
the second phase comprises
a second inductor having a first node and having a second node coupled to the output node,
a second drive switch coupled between the input node and the first node of the second inductor, and
a second circulation switch coupled between the reference node and the first node of the second inductor.

24. The power supply of claim 22 wherein the regulated output signal comprises a regulated output voltage.

25. The power supply of claim 22, further comprising a capacitor coupled between the output node and the reference node.

26. The power supply of claim 22 wherein the reference node comprises a ground node.

27. A system, comprising:
a load; and
a power supply, comprising
an input node,
a reference node,
an output node operable to provide a regulated output signal to the load,
a first phase coupled to the input, reference, and output nodes,
a second phase coupled to the input, reference, and output nodes and being magnetically coupled to the first phase, and
a power supply controller, comprising
a first circuit operable to cause a first current to flow from the input node, through the first phase, to the output node, and
a second circuit operable to cause the second phase to operate in a reduced power dissipation mode while a second current magnetically induced by the first current flows from the reference node, through the second phase, to the output node and while no other load-powering current flows through the second phase.

28. The system of claim 27 wherein the load comprises an integrated circuit.

29. The system of claim 27 wherein at least a portion of the load and at least a portion of the power supply are disposed on a same integrated circuit die.

30. The system of claim 27 wherein at least a portion of the load and at least a portion of the power supply are disposed on respective integrated circuit dies.

31. A power supply, comprising:
an input node;
a reference node;
an output node operable to provide a regulated output signal;
a first phase having a first drive switch coupled between the input and output nodes;
a second phase having a second circulation switch coupled between the reference and output nodes and being magnetically coupled to the first phase; and
a power supply controller, comprising
a first circuit operable to open and close the first drive switch,
a second circuit operable to open and close the second circulation switch, and
a third circuit operable to cause the second circuit to close the second circulation switch while the first drive switch is closed, while a second current flows through the second power supply phase, the second current being magnetically induced by a first current flowing through the first power supply phase, and while no other forward current flows through the second phase.

32. The power supply of claim 31 wherein:
the first phase comprises
a first inductor having a first node coupled to the first drive switch and having a second node coupled to the output node, and
a first circulation switch coupled between the reference node and the first node of the inductor; and
the second phase comprises
a second inductor having a first node coupled to the second circulation switch and having a second node coupled to the output node, and a second drive switch coupled between the input node and the first node of the second inductor.

33. The power supply of claim 31 wherein the regulated output signal comprises a regulated output voltage.

34. The power supply of claim 31, further comprising a capacitor coupled between the output and reference nodes.

35. The power supply of claim 31 wherein the reference node comprises a ground node.

36. A system, comprising:
a load; and
a power supply, comprising,
an input node;
a reference node;
an output node operable to provide a regulated output signal to the load;
a first phase having a first drive switch coupled between the input and output nodes;
a second phase having a second circulation switch coupled between the reference and output nodes and being magnetically coupled to the first phase; and
a power supply controller, comprising
a first circuit operable to open and close the first drive switch,
a second circuit operable to open and close the second circulation switch, and
a third circuit operable to cause the second circuit to close the second circulation switch while the first drive switch is closed, while a second current flows through the second power supply phase, the second current being magnetically induced by a first current flowing through the first power supply phase, and while no other load-powering current flows through the second phase.

37. The system of claim 36 wherein the load comprises an integrated circuit.

38. The system of claim 36 wherein at least a portion of the load and at least a portion of the power supply are disposed on a same integrated circuit die.

39. The system of claim 36 wherein at least a portion of the load and at least a portion of the power supply are disposed on respective integrate circuit dies.

40. A method, comprising:
magnetically inducing a current of a first polarity in a first phase of a power supply while no other current of the first polarity is flowing in the first phase; and
closing a circulation switch of the first phase while the current is being induced.

41. The method of claim 40, further comprising closing the circulation switch only if a drive switch of the first phase is open.

42. The method of claim 40, further comprising magnetically inducing the current in the first phase by driving a current through a second phase of the power supply.

43. The method of claim 40, further comprising
opening the circulation switch in response to a total current through the first phase having a second polarity that is opposite to the first polarity.

44. The method of claim 40, further comprising opening the circulation switch in response to a total current through the first phase having a magnitude that is below a threshold.

45. The method of claim 40, further comprising opening the circulation switch in response to a total current through the first phase having a substantially zero magnitude.

46. A method, comprising:
allowing a current to flow in a direction through a first power supply phase that is magnetically coupled to a second power supply phase; and operating the second 'power supply phase in a reduced voltage drop mode while the current is flowing through the first phase and while no non-magnetically induced current is flowing through the second phase in the direction.

47. The method of claim 46, further comprising allowing the current to flow through the first phase by coupling the first phase to a supply voltage.

48. The method of claim 46, further comprising allowing the current to flow through the first phase by coupling together, with a closed switch, nodes of a filter inductor.

49. The method of claim 46, further comprising allowing the current to flow through the first phase by coupling together, with an active transistor, nodes of a filter inductor.

50. The method of claim 46, further comprising operating the second phase in the reduced voltage drop mode only while no current is being driven through the second phase.

51. The method of claim 46, further comprising operating the second phase in the reduced voltage drop mode by bypassing a diode of the second phase.

52. The method of claim 46, further comprising operating the second phase in the reduced voltage drop mode by bypassing a transistor body diode of the second phase.

53. The method of claim 46, further comprising ceasing operating the second phase in the reduced voltage drop mode in response to a cessation of the flow of current through the first phase.

54. The method of claim 46, further comprising ceasing operating the second phase in the reduced voltage drop mode by un-bypassing a diode of the second phase.

55. The method of claim 46, further comprising ceasing operating the second phase in the reduced voltage drop mode by un-bypassing a transistor body diode of the second phase.

56. The method of claim 46, further comprising ceasing operating the second phase in the reduced voltage drop mode in response to a cessation of a flow of current through the second phase.

57. The method of claim 46, further comprising ceasing operating the second phase in the reduced voltage drop mode in response to a reversal in the direction of the current flowing through the first phase.

58. The method of claim 46, further comprising ceasing operating the second phase in the reduced voltage drop mode in response to a reversal in the direction of the current flowing through the second phase.

59. The method of claim 46, further comprising operating the second phase in the reduced voltage drop mode by activating a transistor through which flows a current magnetically induced in the second phase.

60. The method of claim 46, further comprising operating the second phase in the reduced voltage drop mode by activating a switch through which flows a current magnetically induced in the second phase.

61. The power supply controller of claim 1 wherein the second circuit is further operable to cause the second phase to exit the reduced power dissipation mode in response to a total current flowing through the second phase in the first direction and having a magnitude that is below a threshold.

62. The power supply controller of claim 1 wherein the second circuit is further operable to cause the second phase to exit the reduced power dissipation mode by opening a reference side switch of the second phase in response to the second current substantially equaling zero.

* * * * *

UNITED STATES PATENT AND TRADEMARK OFFICE
CERTIFICATE OF CORRECTION

| | | |
|---|---|---|
| PATENT NO. | : 7,786,711 B2 | Page 1 of 1 |
| APPLICATION NO. | : 12/259220 | |
| DATED | : August 31, 2010 | |
| INVENTOR(S) | : Jia Wei et al. | |

It is certified that error appears in the above-identified patent and that said Letters Patent is hereby corrected as shown below:

In Claim 46, Column 14, Line 1, "operating the second'power supply phase" should read
-- operating the second power supply phase --.

Signed and Sealed this
Eighth Day of March, 2011

David J. Kappos
*Director of the United States Patent and Trademark Office*